(12) United States Patent
Mizukusa (10) Patent No.: US 11,456,468 B2
(45) Date of Patent: Sep. 27, 2022

(54) FUEL CELL-TYPE INDUSTRIAL VEHICLE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventor: Ryo Mizukusa, Aichi-ken (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 16/564,385

(22) Filed: Sep. 9, 2019

(65) Prior Publication Data

US 2020/0083547 A1    Mar. 12, 2020

(30) Foreign Application Priority Data

Sep. 10, 2018  (JP) .............................. JP2018-168577
Jul. 5, 2019    (JP) .............................. JP2019-125751

(51) Int. Cl.
| | |
|---|---|
| *H01M 8/04* | (2016.01) |
| *H01M 8/04082* | (2016.01) |
| *B67D 7/00* | (2010.01) |
| *B67D 7/04* | (2010.01) |
| *H01H 13/18* | (2006.01) |

(52) U.S. Cl.
CPC .......... *H01M 8/04201* (2013.01); *B67D 7/00* (2013.01); *B67D 7/04* (2013.01); *H01H 13/18* (2013.01)

(58) Field of Classification Search
CPC .... B67D 7/32–348; B60K 15/04–0409; B60K 2015/0412–0496; H01H 13/18; H01H 13/183; H01H 13/186; F02N 11/101; H01M 8/0401
See application file for complete search history.

(56) References Cited

U.S. PATENT DOCUMENTS

| | | | | |
|---|---|---|---|---|
| 2,468,673 | A | * | 4/1949 | Kaminky ............... H01H 13/14 74/519 |
| 3,572,305 | A | * | 3/1971 | Moragne ............ B60K 15/0406 123/146.5 R |
| 3,786,207 | A | * | 1/1974 | Houston ................ H01H 36/02 200/61.86 |

(Continued)

FOREIGN PATENT DOCUMENTS

| | | |
|---|---|---|
| JP | 2012-079628 A | 4/2012 |
| JP | 2013-237393 A | 11/2013 |

*Primary Examiner* — Andrew D StClair
(74) *Attorney, Agent, or Firm* — Sughrue Mion, PLLC (57) ABSTRACT

A fuel cell-type industrial vehicle according to the present disclosure includes a vehicle main body in which a fuel cell unit is installed, and controller configured to control operations of the vehicle main body. The fuel cell unit includes a charging plug which is connectable to a charging socket for supplying fuel gas, and a detection mechanism configured to detect the connection state between the charging plug and the charging socket. The detection mechanism includes a sensor having an output signal that shifts in accordance with the connection state of the charging socket relative to the charging plug. The controller prohibits operation of the vehicle main body after determining, on the basis of the output signal of the sensor, that the charging socket is connected to the charging plug.

8 Claims, 8 Drawing Sheets

(56) References Cited

U.S. PATENT DOCUMENTS

| | | | | |
|---|---|---|---|---|
| 3,935,410 A * | 1/1976 | Howard | .................... | H01H 3/14 |
| | | | | 200/332 |
| 5,964,089 A * | 10/1999 | Murphy | .................. | F01N 11/00 |
| | | | | 60/286 |
| 6,011,484 A * | 1/2000 | Dietl | ...................... | B60K 15/05 |
| | | | | 307/10.1 |
| 2002/0020465 A1 * | 2/2002 | Gzik | ...................... | B60K 15/04 |
| | | | | 141/390 |
| 2014/0012444 A1 * | 1/2014 | Wake | ..................... | B60L 1/003 |
| | | | | 701/22 |
| 2014/0170530 A1 * | 6/2014 | Kawaura | ........... | H01M 8/04201 |
| | | | | 429/515 |

\* cited by examiner

FUEL CELL-TYPE INDUSTRIAL VEHICLE

BACKGROUND ART

1. Field of the Invention

The present disclosure relates to an industrial vehicle, and more particularly to a fuel cell-type industrial vehicle.

2. Description of the Related Art

In recent years, fuel cells for vehicles, and in particular industrial vehicles, have come to attention due to the cleanliness and high energy efficiency thereof. Industrial vehicles (referred to hereafter as "fuel cell-type industrial vehicles") that move using power generated by a fuel cell have a charging plug for charging a fuel tank with hydrogen serving as fuel gas. The charging plug is provided in a fuel cell unit that includes the fuel cell. Hydrogen is supplied to the fuel cell-type industrial vehicle at a hydrogen station. A hydrogen supply dispenser is installed in the hydrogen station. A hydrogen supply hose is connected to the dispenser. A charging socket is provided on a tip end portion of the hose. To charge the fuel tank of the fuel cell-type industrial vehicle with hydrogen, the charging socket provided on the tip end portion of the hose is plugged onto and thereby connected to the charging plug of the fuel cell unit.

The fuel cell unit is further provided with an openable and closeable charging lid. The charging lid is provided on a side face of the fuel cell unit so as to cover the charging plug. The charging plug is blocked from the outside when the charging lid is closed and exposed to the outside when the charging lid is open. Therefore, when the fuel tank of the fuel cell-type industrial vehicle is charged with hydrogen, the charging lid must be opened before connecting the charging socket to the charging plug. Japanese Patent Application Publication No. 2013-237393 describes a technique of providing a limit switch having an output signal that switches in response to an opening or closing operation of the charging lid so that the open/closed state of the charging lid is detected by the limit switch.

SUMMARY OF THE INVENTION

It is generally necessary to stop the fuel cell-type industrial vehicle while charging the fuel tank with hydrogen. Therefore, when an operator opens the charging lid and this is detected from the output signal of the limit switch, for example, it is desirable to execute control to stop the fuel cell-type industrial vehicle until the charging lid is closed.

Meanwhile, in a fuel cell-type industrial vehicle, a cover may be attached to a side face of a vehicle main body to improve the design. The cover is attached so as to cover the side face of the fuel cell unit. As noted above, however, the charging lid is provided on the side face of the fuel cell unit, and therefore, when a cover is attached to the side face of the vehicle main body, the charging lid is hidden behind the cover. It is therefore necessary to provide an opening/closing door in the cover in alignment with the position of the charging lid.

However, when a cover with a door, such as that described above, is attached to the vehicle main body, a so-called double door, in which the charging lid exists on the rear side of the cover door, is formed. Hence, to charge the fuel tank with hydrogen, first the cover door is opened, and then the charging lid is opened. As a result, the charging operation performed by the operator becomes complicated. Further, to simplify the charging operation, a configuration in which the charging lid is omitted so that the output signal of the limit switch switches in response to opening and closing of the cover door may be employed. In this case, however, the relative positions of the cover attached to the vehicle main body and the limit switch provided in the fuel cell unit may deviate from each other. It is therefore necessary to finely adjust the position of the limit switch in alignment with the positions of the fuel cell unit and the cover door.

The present disclosure has been designed to solve the problems described above, and an object thereof is to provide a fuel cell-type industrial vehicle in which control can be executed to ensure that the industrial vehicle does not move while being charged with fuel gas without providing a charging lid on a fuel cell unit and without using a cover door.

A fuel cell-type industrial vehicle according to the present disclosure includes a fuel cell unit having a fuel cell unit including a fuel cell; a fuel tank provided in the fuel cell unit and configured to store fuel gas that is supplied to the fuel cell; a vehicle main body in which the fuel cell unit is installed; and controller configured to control operations of the vehicle main body, the fuel cell unit including a charging plug configured to charge the fuel tank with the fuel gas, the charging plug being connectable to a charging socket for supplying the fuel gas; and a detection mechanism configured to detect a connection state between the charging plug and the charging socket, wherein the detection mechanism includes a sensor having an output signal that shifts in accordance with the connection state of the charging socket relative to the charging plug, and wherein the controller executes control to prohibit the operations of the vehicle main body after determining, on the basis of the output signal of the sensor, that the charging socket is connected to the charging plug.

DESCRIPTION OF THE PREFERRED EMBODIMENTS

First Embodiment

A first embodiment of the present disclosure will be described in detail below with reference to the figures.

Note that in the first embodiment, a fuel cell type forklift will be described as an example of a fuel cell-type industrial vehicle. Further, in the first embodiment, respective directions "front-rear", "left-right", and "up-down" are defined using a state in which an operator is sitting on the driver's seat of the forklift oriented toward a forward advancement direction of the forklift as a reference.

Forklift

Figure 1:
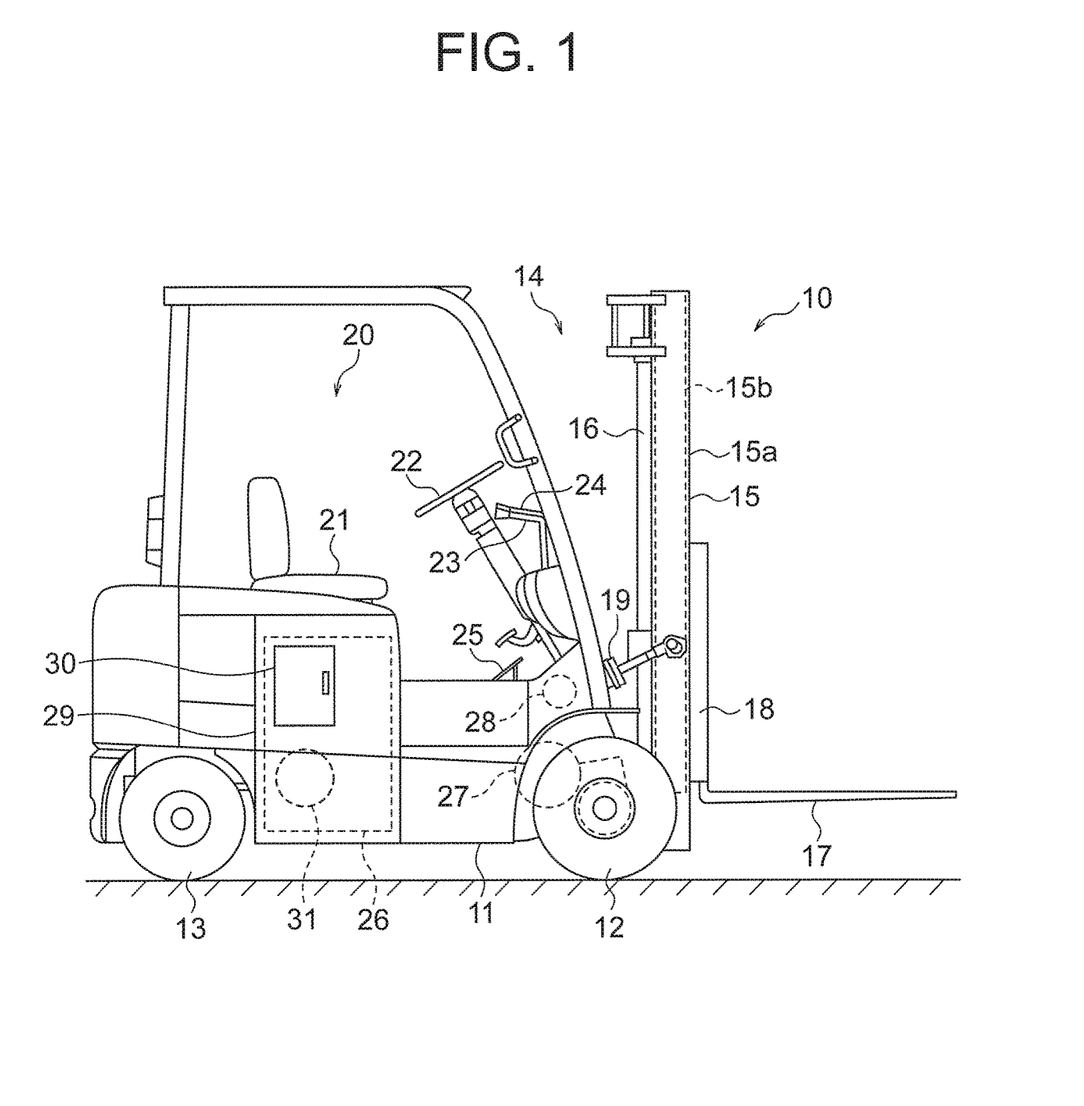
FIG. 1 is a side view of a forklift serving as a fuel cell-type industrial vehicle according to a first embodiment of the present disclosure.

FIG. 1 is a side view of the forklift serving as the fuel cell-type industrial vehicle according to the first embodiment of the present disclosure.

As shown in FIG. 1, a forklift 10 includes a vehicle body portion 11, drive wheels 12 provided on a front side lower portion of the vehicle body portion 11, steering wheels 13 provided on a rear side lower portion of the vehicle body portion 11, and load handling equipment 14 provided on a front portion of the vehicle body portion 11. Of these components, the vehicle body portion 11 and the load handling equipment 14 constitute a vehicle main body of the forklift 10. Further, in the front-rear direction of the forklift 10, the drive wheels 12 correspond to front wheels and the steering wheels 13 correspond to rear wheels.

The load handling equipment 14 includes a mast 15, a lift cylinder 16, a fork 17, a lift bracket 18, and a left-right pair of tilt cylinders 19. The mast 15 is provided on the front portion of the vehicle body portion 11. The mast 15 includes a left-right pair of outer masts 15a and a left-right pair of inner masts 15b. The lift cylinder 16 is provided on a rear portion of the pair of outer masts 15a. The lift bracket 18 is provided on a front portion of the mast 15 to be capable of ascending and descending. The fork 17 is attached to the lift bracket 18 so as to ascend and descend together with the lift bracket 18.

The left-right pair of tilt cylinders 19 cause the mast 15 to perform a tilting operation in the front-rear direction, and are provided to correspond to the left-right pair of outer masts 15a. Base end portions of the tilt cylinders 19 are coupled rotatably to the vehicle body portion 11. Tip end portions of the tilt cylinders 19 are coupled rotatably to side faces of the outer masts 15a. When the tilt cylinders 19 are driven to expand and contract, the mast 15 performs a tilting operation in the front-rear direction.

Further, a cabin 20 is provided on the forklift 10. A driver's seat 21 is provided in the cabin 20. A steering wheel 22, a lift lever 23, and a tilt lever 24 are installed in front side of the driver's seat 21. The steering wheel 22 is used to charge the orientation of the steering wheels 13. The lift lever 23 is used to raise and lower the fork 17. The tilt lever 24 is used to cause the mast 15 to perform a tilting operation in the front-rear direction. An accelerator pedal 25 is provided on a floor surface of the cabin 20. The accelerator pedal 25 is used to adjust the rotation speed of the drive wheels 12, or in other words the travel speed of the forklift 10. The travel speed of the forklift 10 is adjusted in accordance with a depression amount of the accelerator pedal 25.

A fuel cell unit 26, a driving motor 27, and a load handling motor 28 are installed in the vehicle body portion 11. The fuel cell unit 26 includes a fuel cell, not shown in the figure. The fuel cell is connected to a fuel tank 31. The fuel tank 31 is provided in the fuel cell unit 26. Fuel gas required by the fuel cell to generate power is stored in the fuel tank 31.

The fuel cell unit 26 is covered by a cover 29. The cover 29 is attached to a side face portion of the vehicle body portion 11 in order to improve the design of the forklift 10. The cover 29 is painted the same color as the vehicle body portion 11. An openable and closeable door 30 is provided in the cover 29.

The driving motor 27 serves as a drive source for rotating the drive wheels 12. Although not shown in the figure, an output shaft of the driving motor 27 is coupled to a rotary shaft of the drive wheels 12 via a reduction gear. The load handling motor 28 serves as a drive source for causing the fork 17 to perform ascending/descending operations and tilting operations. The load handling motor 28 causes the lift cylinder 16 and the tilt cylinders 19 to perform expansion/contraction operations by driving a hydraulic pump, not shown in the figure.

Fuel Cell Unit

Figure 2:
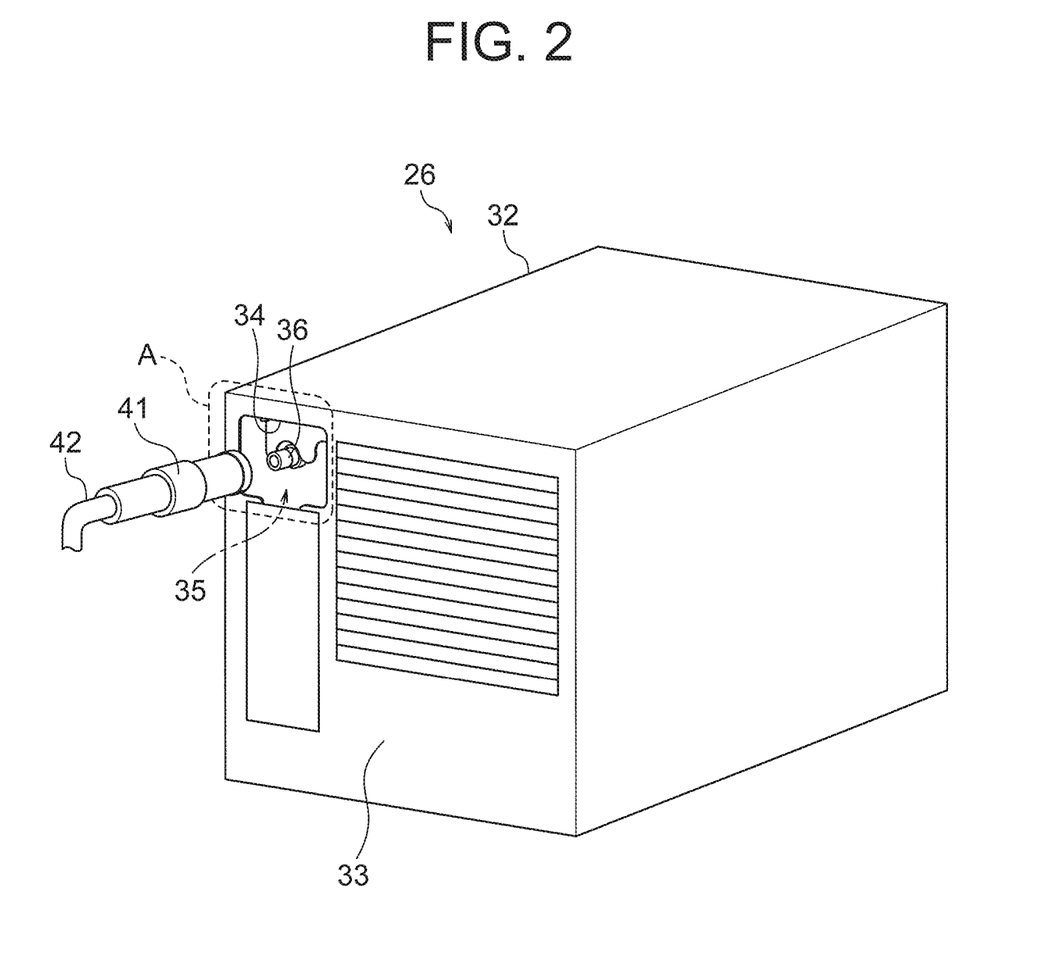
FIG. 2 is a schematic perspective view showing the outer appearance of a fuel cell unit provided in the forklift shown in FIG. 1.
Figure 3:
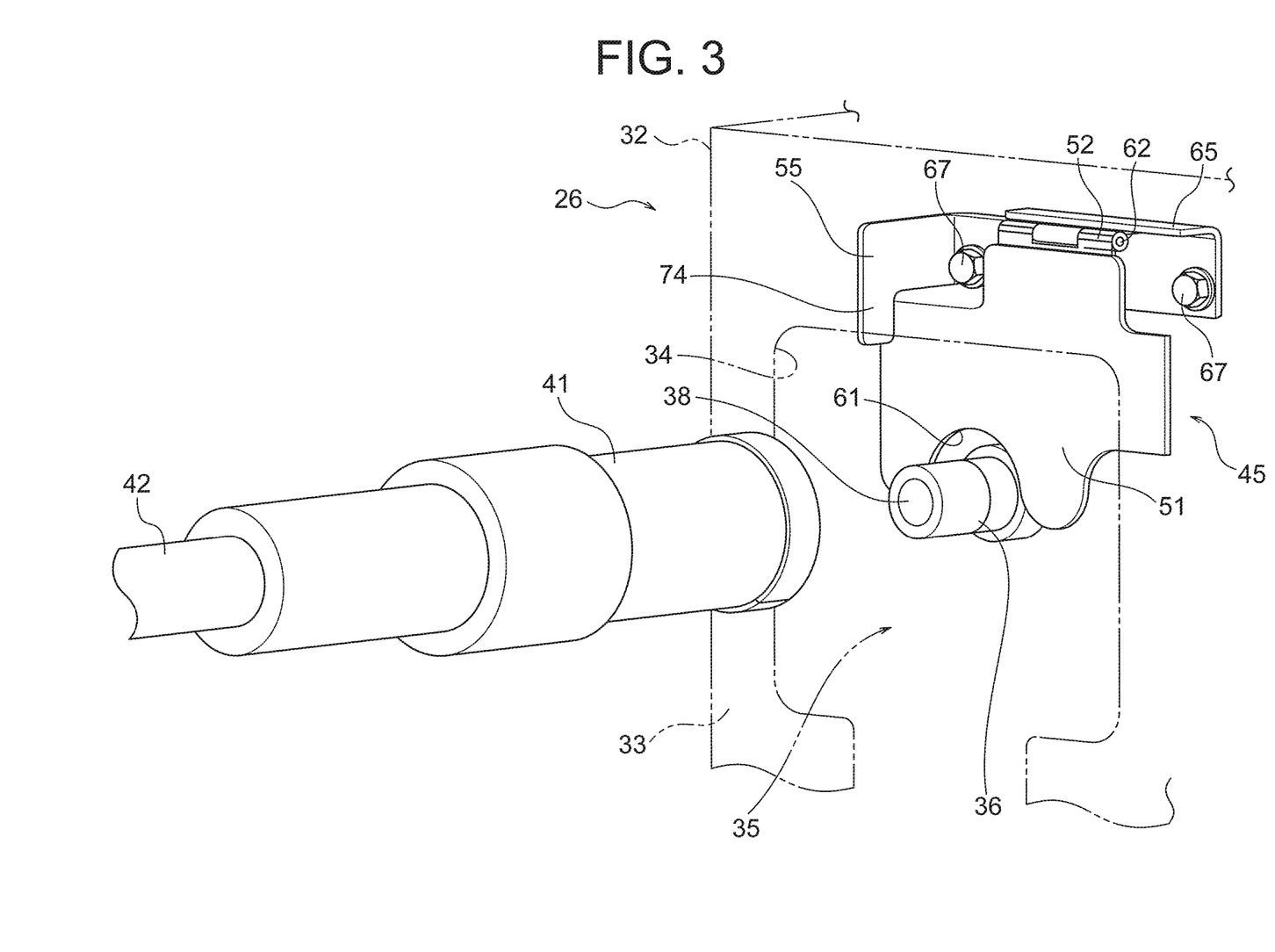
FIG. 3 is an enlarged view of a portion A of FIG. 2.

FIG. 2 is a schematic perspective view showing the outer appearance of the fuel cell unit provided in the forklift shown in FIG. 1. Further, FIG. 3 is an enlarged view of a portion A of FIG. 2. Note that in FIG. 3, a casing of the fuel cell unit is indicated by a dot-dot-dash line, and the interior of the casing is partially shown in a see-through manner.

As shown in FIG. 2, the fuel cell unit 26 includes a casing 32. The casing 32 is formed overall in the shape of a rectangular parallelepiped. The fuel cell is provided in the interior of the casing 32. One side face of the casing 32 is covered by a plate 33. When the fuel cell unit 26 is installed in the forklift 10, the plate 33 is disposed to face the side face of the vehicle body portion 11. The plate 33 is formed in a substantially square shape. A window portion 34 for charging fuel gas is formed in one corner portion of the plate 33. The window portion 34 is formed by cutting out a part of the plate 33.

As shown in FIG. 3, a space 35 recessed relative to the plate 33 is formed on the rear side of the window portion 34. In the first embodiment, a charging lid is not provided on the fuel cell unit 26. Therefore, even when the cover 29 (see FIG. 1) is attached to the vehicle body portion 11, as described above, a double door is not formed. A charging plug 36 is disposed in the space 35. The charging plug 36 is used to charge the fuel tank 31 of the forklift 10 with hydrogen. The door 30 in the cover 29 shown in FIG. 1 is provided in alignment with the position of the charging plug 36 in the fuel cell unit 26. Therefore, when the door 30 is opened, the charging plug 36 of the fuel cell unit 26 is exposed to the outside. The charging plug 36 is connected to the fuel tank 31 through a fuel gas supply passage, not shown in the figure. The charging plug 36 is formed in a cylindrical shape. A cap (not shown) is mounted on the charging plug 36. The cap is mounted on a tip end portion of the charging plug 36 in order to close a reception port 38 of the charging plug 36 at times other than during charging.

Meanwhile, a charging socket 41 is used to supply the fuel gas. The charging socket 41 described above is configured so as to be connectable to the charging plug 36. Furthermore, in the first embodiment, the charging plug 36 is configured so that the charging socket 41 can be plugged thereon and unplugged therefrom. The charging socket 41 is formed in a cylindrical shape. An outer diameter dimension of the charging socket 41 is set to be larger than an outer diameter dimension of the charging plug 36. The charging socket 41 is provided on a tip end portion of a hydrogen supply hose 42. The hose 42 is connected to a dispenser in a hydrogen station, not shown in the figure, and hydrogen is delivered from the dispenser to the charging socket 41 through the hose 42.

To connect the charging socket 41 to the charging plug 36, the cap is removed from the charging plug 36 so as to expose the reception port 38, and then the tip end portion of the charging socket 41 is plugged onto the reception port 38. When the charging socket 41 is plugged onto the charging plug 36, a connection state between the two components is locked by a lock mechanism, not shown in the figure, and in this state, the fuel tank 31 is charged with hydrogen. To remove the charging socket 41 from the charging plug 36, meanwhile, the lock formed by the lock mechanism is released, whereupon the charging socket 41 is unplugged from the charging plug 36.

Detection Mechanism

Figure 4:
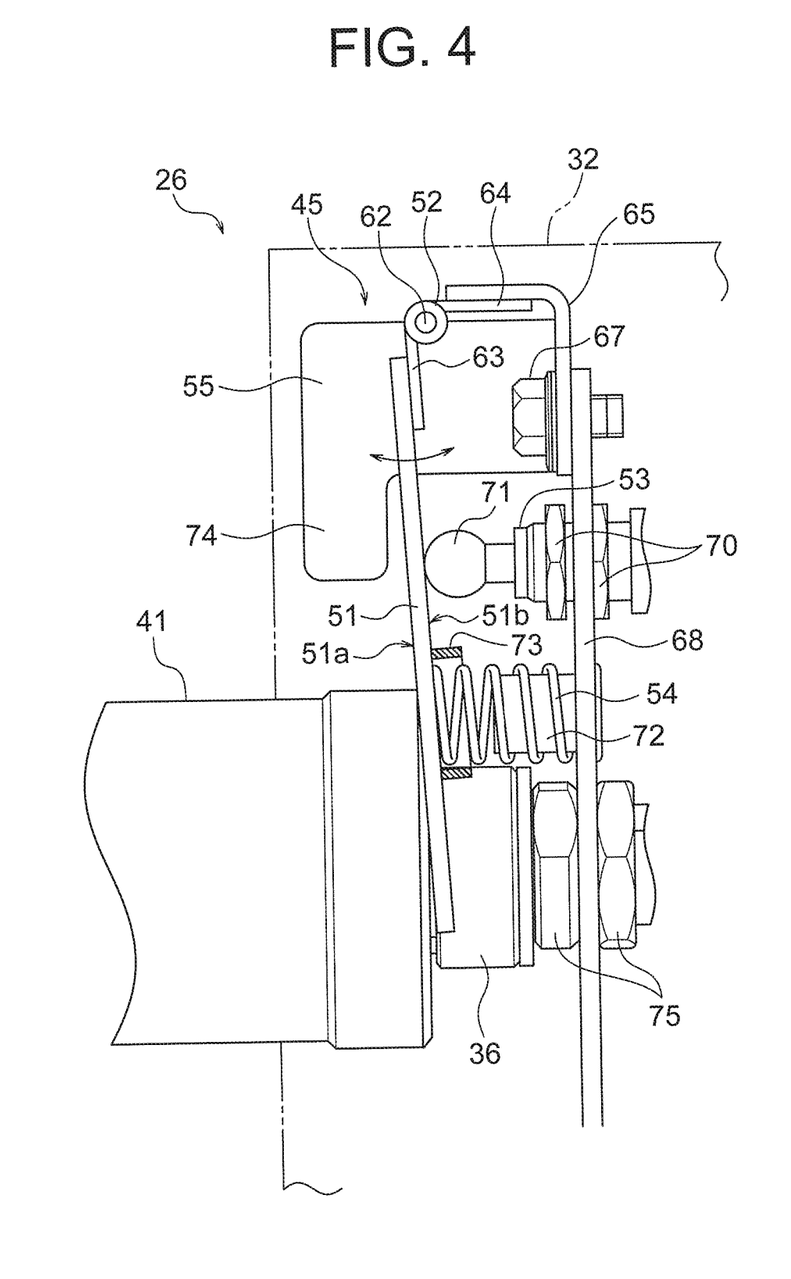
FIG. 4 is a view showing a detection mechanism from an orthogonal direction to a central axis direction of a charging plug.

As shown in FIGS. 3 and 4, the fuel cell unit 26 further includes a detection mechanism 45 configured to detect the connection state between the charging plug 36 and the charging socket 41. The connection state between the charging plug 36 and the charging socket 41 may be one of two states. In one state, the charging socket 41 is connected to the charging plug 36. In the other state, the charging socket 41 is not connected to the charging plug 36. In other words, the detection mechanism 45 is used to detect whether or not the charging socket 41 is connected to the charging plug 36.

The detection mechanism 45 includes a pressing plate 51 disposed near the charging plug 36, a hinge 52 that freely movably supports the pressing plate 51, a limit switch 53 having an output signal that shifts when the limit switch 53 is pressed by the pressing plate 51, a spring member 54 for pushing the pressing plate 51 back, and a limiting plate 55 for limiting the movable range of the pressing plate 51.

Pressing Plate

The pressing plate 51 corresponds to a moving member that is pushed by the charging socket 41 so as to move in a predetermined direction when the charging socket 41 is plugged onto the charging plug 36.

Figure 5:
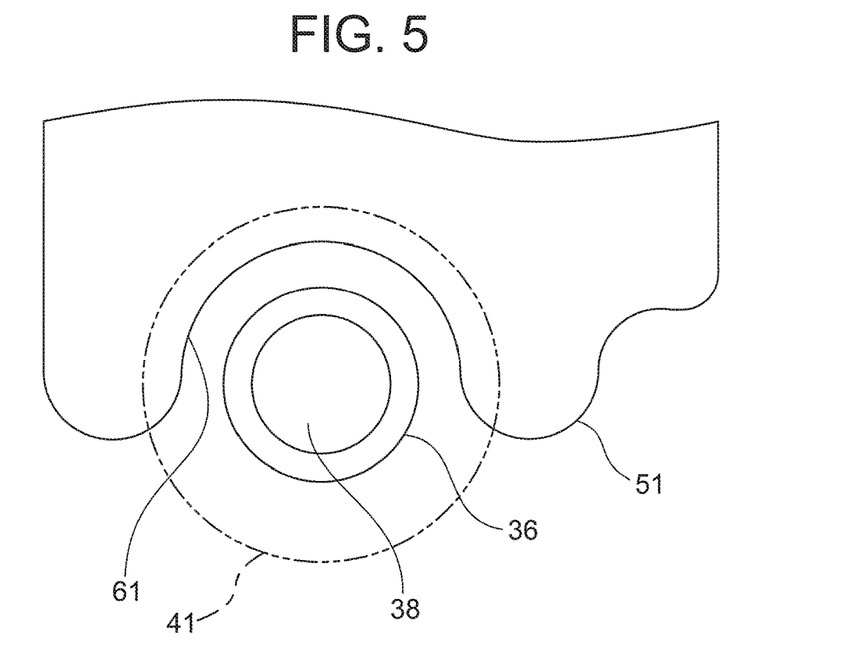
FIG. 5 is a front view showing a positional relationship between a charging socket and a pressing plate in a case where the charging socket is assumed to be connected to the charging plug.

FIG. 5 is a front view showing a positional relationship between the charging socket and the pressing plate when the charging socket is connected to the charging plug. Note that in FIG. 5, the outer peripheral shape of a tip end part of the charging socket, when seen from a central axis direction of the charging plug, is indicated by a dot-dot-dash line.

The position of the pressing plate 51 in the central axis direction of the charging plug 36 is set back from the reception port 38 by a predetermined dimension toward the rear side so that when the charging socket 41 is plugged onto and connected to the charging plug 36, the pressing plate 51 is pushed toward the rear side by the tip end portion of the charging socket 41.

A semicircular recess portion 61 is formed in the pressing plate 51. The recess portion 61 curves around the outer peripheral shape of the charging plug 36 in a semicircular shape. Further, the recess portion 61 is disposed to surround the upper-side outer peripheral surface of the charging plug 36.

Meanwhile, the tip end portion of the charging socket 41 connected to the charging plug 36, when seen from the central axis direction of the charging plug 36, is disposed so as to project beyond the recess portion 61 of the pressing plate 51 toward the radial direction outer side of the charging plug 36. Accordingly, the charging socket 41 and the pressing plate 51 are disposed so as to overlap on the outer side of the recess portion 61. Hence, when the charging socket 41 is plugged onto the charging plug 36, the tip end portion of the charging socket 41 contacts the pressing plate 51 while the charging socket 41 is being plugged in, and as a result, the pressing plate 51 is pushed to the rear side.

Hinge

As shown in FIG. 4, the hinge 52 includes a shaft portion 62 and a pair of wing portions 63, 64 that are free to rotate about the shaft portion 62. The pressing plate 51 is attached to the wing portion 63 by welding, for example. The pressing plate 51 is supported to be free to perform a rotary motion about the shaft portion 62 of the hinge 52. Further, the pressing plate 51 is suspended by its own weight from the hinge 52. The wing portion 64 is attached to a bracket 65 by welding, for example. The bracket 65 is constituted by an L-shaped plate. The bracket 65 is fixed to a plug attachment plate 68 by bolts 67. The plug attachment plate 68 is fixed to the casing 32 of the fuel cell unit 26.

Limit Switch

The limit switch 53 corresponds to a sensor having an output signal that shifts in accordance with the connection state of the charging socket 41 relative to the charging plug 36. The output signal of the limit switch 53 enters an ON state when the charging socket 41 is plugged onto the charging plug 36 and enters an OFF state when the charging socket 41 is unplugged from the charging plug 36. Hence, in a state where the charging socket 41 is connected to the charging plug 36, the output signal of the limit switch 53 is ON, and in a state where the charging socket 41 is not connected to the charging plug 36, the output signal of the limit switch 53 is OFF.

As shown in FIG. 4, the limit switch 53 is attached to the plug attachment plate 68 using a pair of nuts 70. The pair of nuts 70 are screwed onto a male screw (not shown) formed on a trunk portion of the limit switch 53. Further, the pair of nuts 70 sandwich the plug attachment plate 68 from respective sides in a plate thickness direction, thereby fixing the limit switch 53 to the plug attachment plate 68. The charging plug 36 is attached to the plug attachment plate 68 using a pair of nuts 75. The attachment position of the limit switch 53 in the central axis direction of the charging plug 36 can be adjusted by appropriately loosening and re-tightening the pair of nuts 70. The limit switch 53 is disposed on the upper side of the charging plug 36. Further, the limit switch 53 includes a movable element or mover 71. The mover 71 is capable of moving in a parallel direction to the plate thickness direction of the plug attachment plate 68 (the left-right direction in FIG. 4). Furthermore, the mover 71 is biased in a single direction (the leftward direction in FIG. 4) by a return spring built into the limit switch 53.

Here, when the surface, among two main surfaces 51a, 51b of the pressing plate 51, that faces the outer side of the casing 32 is set as a front surface 51a and the surface that faces the inner side of the casing 32 is set as a rear surface 51b, the mover 71 is disposed opposite the rear surface 51b of the pressing plate 51. Further, in a state where the pressing plate 51 is disposed in an initial position (to be described in detail below), the mover 71 of the limit switch 53 is disposed near the rear surface 51b of the pressing plate 51. When the pressing plate 51 moves in a counterclockwise direction in FIG. 4 about the shaft portion 62 of the hinge 52, the mover 71 is pressed in by the pressing plate 51, whereby the output signal of the limit switch 53 shifts from the OFF state to the ON state.

Spring Member

The spring member 54 corresponds to a biasing member for biasing the pressing plate 51 in the clockwise direction of FIG. 4. The spring member 54 is disposed between the pressing plate 51 and the plug attachment plate 68 in the central axis direction of the charging plug 36. The spring member 54 is configured by a compression coil spring. When the pressing plate 51 is pushed toward the rear side by the tip end portion of the charging socket 41, the spring member 54 undergoes compressive deformation, thereby generating spring force for pushing the pressing plate 51 back toward the front side. Further, when the charging socket 41 is not connected to the charging plug 36, the spring member 54 generates spring force for holding the pressing plate 51 in the initial position (to be described in detail below).

The spring member 54 is supported by a support pin 72. The support pin 72 is fixed to the plug attachment plate 68. The support pin 72 projects in the plate thickness direction of the plug attachment plate 68, and the spring member 54 is attached to this projecting part. Further, a tubular portion 73 is provided on the rear surface 51b of the pressing plate 51. The tubular portion 73 may be formed integrally with the pressing plate 51 or fixed to the pressing plate 51 by adhesion, screwing, or the like. One end portion of the spring member 54 is housed in the tubular portion 73. The tubular portion 73 is used to suppress positional deviation of the spring member 54 relative to the pressing plate 51.

(Limiting Plate)

The limiting plate 55 is attached to the plug attachment plate 68. The limiting plate 55 may be formed integrally with the bracket 65 or attached to the plug attachment plate 68 as a separate member to the bracket 65. The limiting plate 55 includes an integral butting portion 74. The butting portion 74 is disposed on the front surface 51a side of the pressing plate 51. Further, the butting portion 74 projects downward. The movable range of the pressing plate 51 is limited by contact between the front surface 51a of the pressing plate 51 and the butting portion 74 of the limiting plate 55. Further, the initial position of the pressing plate 51 is determined univocally when the front surface 51a of the pressing plate 51 butts the butting portion 74 of the limiting plate 55. At this time, the pressing plate 51 is held in a state of butting the butting portion 74 by the biasing force of the spring member 54. The initial position of the pressing plate 51 indicates the position of the pressing plate 51 when the charging socket 41 is not connected to the charging plug 36, or more specifically, the position of the pressing plate 51 when the front surface 51a of the pressing plate 51 is caused to butt the butting portion 74 by the biasing force of the spring member 54.

Operation of Detection Mechanism

Next, an operation of the detection mechanism 45 will be described.

First, when the charging socket 41 is not connected to the charging plug 36, the pressing plate 51 receives the biasing force of the spring member 54 so as to butt the butting portion 74 of the limiting plate 55, and as a result, the pressing plate 51 is held in the initial position. When the pressing plate 51 is in the initial position, the mover 71 of the limit switch 53 is held by the biasing force of the return spring so as to project by a predetermined amount. Accordingly, the output signal of the limit switch 53 is OFF.

When, on the other hand, the charging socket 41 is plugged onto the charging plug 36, the tip end portion of the charging socket 41 contacts the front surface 51a of the pressing plate 51 midway through the plugging-in operation. When the charging socket 41 is plugged in further, the pressing plate 51 is pushed by the charging socket 41 so as to move in the counterclockwise direction of FIG. 4 about the shaft portion 62. At this time, the spring member 54 is pressed by the pressing plate 51 so as to undergo compressive deformation. Moreover, as described above, when the pressing plate 51 moves, the rear surface 51b of the pressing plate 51 contacts the mover 71 of the limit switch 53, and in this state, the mover 71 is pressed in by the pressing plate 51. As a result, the output signal of the limit switch 53 shifts from the OFF state to the ON state.

Further, when the charging socket 41 is unplugged from the charging plug 36, the pressing plate 51 moves in the clockwise direction of FIG. 4 about the shaft portion 62 while receiving the biasing force of the spring member 54. At this time, the pressing plate 51 moves until caused to butt the butting portion 74 of the limiting plate 55 by the biasing force of the spring member 54. The spring member 54 thus functions to return the pressing plate 51 to the initial position. The mover 71 of the limit switch 53, meanwhile, moves in the leftward direction of FIG. 4 in accordance with the movement of the pressing plate 51. As a result, the output signal of the limit switch 53 shifts from the ON state to the OFF state.

Hence, in the detection mechanism 45, when the charging socket 41 is plugged onto the charging plug 36, the output signal of the limit switch 53 enters the ON state, and when the charging socket 41 is unplugged from the charging plug 36, the output signal of the limit switch 53 enters the OFF state. Therefore, by monitoring the output signal of the limit switch 53, it is possible to detect whether or not the charging socket 41 is plugged onto the charging plug 36.

Figure 6:
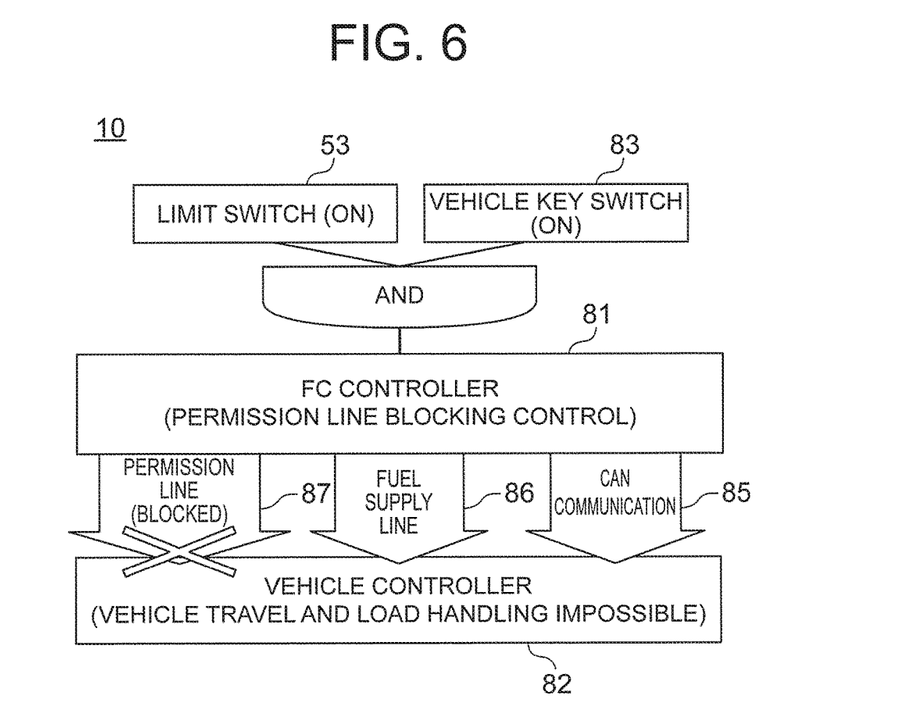
FIG. 6 is a schematic view illustrating a configuration and processing content of a control system of the fuel cell-type industrial vehicle according to the first embodiment.

FIG. 6 is a schematic view illustrating a configuration and processing content of a control system of the fuel cell-type industrial vehicle according to the first embodiment.

First, the forklift 10 serving as the fuel cell-type industrial vehicle according to the first embodiment includes an FC controller 81 and a vehicle controller 82. The FC controller 81 controls the operations of the fuel cell unit 26 and is provided in the fuel cell unit. The vehicle controller 82 controls the operations of the vehicle main body of the forklift 10 and is provided in the vehicle body. The FC controller 81 and the vehicle controller 82 together constitute control means for controlling the operations of the vehicle main body on the basis of the detection result from the detection mechanism 45.

The limit switch 53 and a vehicle key switch 83 are electrically connected to the FC controller 81. The output signal of the limit switch 53 and an output signal from the vehicle key switch 83 are input individually into the FC controller 81. The vehicle key switch 83 is used to detect a key ON state. The key ON state denotes a state in which the output signal of the vehicle key switch 83 is ON. The output signal of the vehicle key switch 83 shifts in response to a key operation performed by the operator on a vehicle key. To describe a specific example, the output signal of the vehicle key switch 83 enters the ON state when the operator inserts the vehicle key into a key cylinder (not shown) provided on the periphery of the steering wheel 22 in the cabin 20 and turns the vehicle key from a stop position to a key ON position, and enters the OFF state when the operator returns the vehicle key to the stop position. Hence, in a state where the vehicle key switch 83 has detected the key ON state, the output signal of the vehicle key switch 83 is ON.

The FC controller 81 performs CAN (Controller Area Network) communication 85 with the vehicle controller 82, and outputs a power supply line 86 and a permission line 87 to the vehicle controller 82. The CAN communication 85 is constituted by a communication network for exchanging various types of information required to control the forklift 10 between the FC controller 81 and the vehicle controller 82. The power supply line 86 and the permission line 87 are lines connecting the FC controller 81 to the vehicle controller 82. Further, the power supply line 86 is a line for supplying power generated by the fuel cell in the fuel cell unit 26 to the vehicle side of the forklift 10. The permission line 87 is a line for permitting the operations of the vehicle main body of the forklift 10. The operations of the vehicle main body of the forklift 10 include a travel operation performed by the vehicle body portion 11 and a load handling operation performed by the load handling equipment 14. The travel operation is executed by rotating the drive wheels 12, and the load handling operation is executed by driving the lift cylinder 16 and the tilt cylinders 19.

In the control configuration described above, when the operator inserts the vehicle key into the key cylinder and turns the vehicle key from the stop position to the key ON position, the output signal of the vehicle key switch 83 shifts from the OFF state to the ON state. As a result, the vehicle key switch 83 detects the key ON state. In this state, an ON signal is output to the FC controller 81 from the vehicle key switch 83. Accordingly, the FC controller 81, having received the ON signal from the vehicle key switch 83, determines whether or not the charging socket 41 is connected to the charging plug 36 on the basis of the output signal from the limit switch 53. When, at this time, the output signal of the limit switch 53 is in the OFF state, the FC controller 81 determines that the charging socket 41 is not connected to the charging plug 36, and when the output signal of the limit switch 53 is in the ON state, the FC controller 81 determines that the charging socket 41 is connected to the charging plug 36. Having determined that the charging socket 41 is connected to the charging plug 36, the FC controller 81 blocks the permission line 87. Note that a case in which the FC controller 81 determines that the charging socket 41 is connected to the charging plug 36 in a state where the vehicle key switch 83 has detected the key ON state corresponds to a case in which the output signal of the vehicle key switch 83 and the output signal of the limit switch 53 are both ON, or in other words a case in which the AND condition shown in FIG. 6 is satisfied.

When the FC controller 81 blocks the permission line 87, as described above, the vehicle controller 82 prohibits the operations of the vehicle main body of the forklift 10. As a result, execution of the travel operation and load handling operation of the forklift 10 becomes impossible. When the operations of the vehicle main body of the forklift 10 are prohibited by the vehicle controller 82 in this manner, the drive wheels 12 remain stationary and do not rotate even if the operator depresses the accelerator pedal 25, and the lift cylinder 16 and tilt cylinders 19 remain stationary without being driven even if the operator operates the lift lever 23 or the tilt lever 24.

Effects of First Embodiment

The first embodiment employs a configuration in which the output signal of the limit switch 53 serving as one of the constituent elements of the detection mechanism 45 shifts when the charging socket 41 is plugged onto and unplugged from the charging plug 36. Further, when the output signal of the limit switch 53 enters the ON state, the FC controller 81 determines that the charging socket 41 is plugged onto the charging plug 36 and executes control to prohibit the operations of the vehicle main body of the forklift 10. Hence, control can be implemented to ensure that the forklift 10 does not move while being charged with fuel gas without providing a charging lid on the fuel cell unit 26 and without using the door 30 in the cover 29 to shift the output signal of the limit switch. Moreover, in the first embodiment, since a charging lid is not provided on the fuel cell unit 26, a double door is not formed even when the cover 29 is attached to the vehicle body portion 11. Therefore, complication of the charging operation due to the existence of a double door can be avoided. Furthermore, the output signal of the limit switch 53 shifts regardless of the opening and closing operations of the door 30 in the cover 29, and therefore the need to finely adjust the position of the limit switch 53 in alignment with the position of the door 30 in the cover 29 is eliminated.

Further, the first embodiment employs a configuration in which the detection mechanism 45 is provided with the pressing plate 51 that is pushed and moved by the charging socket 41 when the charging socket 41 is plugged onto the charging plug 36, and the output signal of the limit switch 53 is shifted by the movement of the pressing plate 51. As a result, the degree of freedom in the attachment position of the limit switch 53 can be increased.

Moreover, the first embodiment employs a configuration in which, after the pressing plate 51 has moved in response to being pushed by the charging socket 41 as the charging socket 41 is plugged onto the charging plug 36, the pressing plate 51 is pushed back by the biasing force of the spring member 54. Hence, when the charging socket 41 is unplugged from the charging plug 36, the pressing plate 51 can be pushed back using the biasing force of the spring member 54. As a result, the output signal of the limit switch 53 can be shifted reliably in response to the charging socket 41 being plugged onto and unplugged from the charging plug 36. Instead of providing the spring member 54 in the detection mechanism 45, the pressing plate 51 can be pushed back by the biasing force of the return spring built into the limit switch 53 alone, but in this case, the load on the return spring increases, and as a result, the life of the limit switch 53 may be shortened. When the spring member 54 is provided, however, the load on the return spring is greatly reduced, and as a result, the life of the limit switch 53 can be extended.

The first embodiment also employs a configuration in which the tubular portion 73 is provided on the pressing plate 51 and one end portion of the spring member 54 is housed in the tubular portion 73. Hence, when the pressing plate 51 moves in a counterclockwise direction or a clockwise direction about the shaft portion 62 in response to the charging socket 41 being plugged onto or unplugged from the charging plug 36, positional deviation of the spring member 54 relative to the pressing plate 51 can be suppressed, and as a result, the biasing force of the spring member 54 can be transmitted reliably to the pressing plate 51.

Second Embodiment

Next, a second embodiment of the present disclosure will be described.

A fuel cell-type industrial vehicle according to the second embodiment of the present disclosure differs from the first embodiment, described above, in the configuration of the detection mechanism for detecting the connection state between the charging plug 36 and the charging socket 41.

Figure 7:
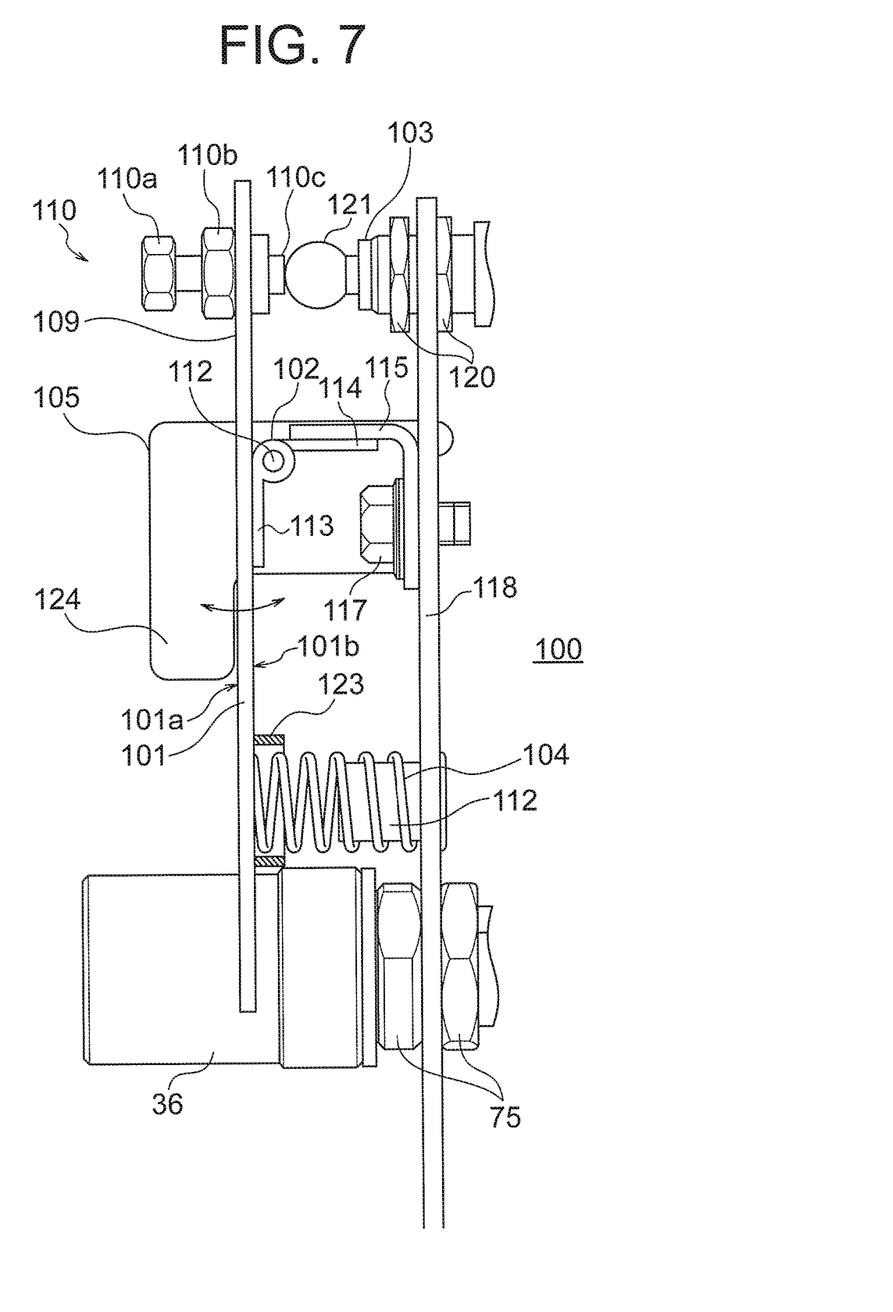
FIG. 7 is a view showing a detection mechanism provided in a fuel cell-type industrial vehicle according to a second embodiment of the present disclosure from a direction orthogonal to the central axis direction of the charging plug.

FIG. 7 is a view showing the detection mechanism provided in the fuel cell-type industrial vehicle according to the second embodiment of the present disclosure from an orthogonal direction to the central axis direction of the charging plug.

As shown in FIG. 7, a detection mechanism 100 includes a pressing plate 101 disposed near the charging plug 36, a hinge 102 that supports the pressing plate 101 to be free to move, a limit switch 103 having an output signal that shifts in response to movement of the pressing plate 101, a spring member 104 for pushing the pressing plate 101 back, and a limiting plate 105 for limiting the movable range of the pressing plate 101.

Pressing Plate

The pressing plate 101 corresponds to a moving member that is pushed by the charging socket 41 so as to move in a predetermined direction when the charging socket 41 is plugged onto the charging plug 36. FIG. 7 shows a state before the charging socket 41 is plugged onto the charging plug 36, and therefore the charging socket 41 is not shown. A semicircular recessed portion (not shown) is formed in the pressing plate 101, similarly to the pressing plate 51 described in the first embodiment. Further, an upper portion 109 of the pressing plate 101 extends upward beyond the position of the hinge 102. A contactor 110 is attached to the upper portion 109 of the pressing plate 101. The contactor 110 includes a bolt 110a and a nut 110b for fixing the bolt 110a to the upper portion 109 of the pressing plate 101. A screw portion 110c of the bolt 110a penetrates the pressing plate 101 so as to project to the opposite side to the bolt 110a.

Hinge

The hinge 102 includes a shaft portion 112 and a pair of wing portions 113, 114 that are free to rotate about the shaft portion 112. The pressing plate 101 is attached to the wing portion 113 by welding or the like. The pressing plate 101 is supported to be free to perform a rotary motion about the shaft portion 112 of the hinge 102. The wing portion 114 is attached to a bracket 115 by welding or the like. The bracket 115 is constituted by an L-shaped plate. The bracket 115 is fixed to a plug attachment plate 118 by bolts 117. The plug attachment plate 118 is fixed to the casing 32 of the fuel cell unit 26.

Limit Switch

The limit switch 103 corresponds to a sensor having an output signal that shifts in accordance with the connection state of the charging socket 41 relative to the charging plug 36. The output signal of the limit switch 103 enters an OFF state when the charging socket 41 is plugged onto the charging plug 36 and enters an ON state when the charging socket 41 is unplugged from the charging plug 36. Hence, in a state where the charging socket 41 is connected to the charging plug 36, the output signal of the limit switch 103 is OFF, and in a state where the charging socket 41 is not connected to the charging plug 36, the output signal of the limit switch 103 is ON.

The limit switch 103 is attached to the plug attachment plate 118 using a pair of nuts 120. The pair of nuts 120 are screwed onto a male screw (not shown) formed on a trunk portion of the limit switch 103. Further, the pair of nuts 120 sandwich the plug attachment plate 118 from respective sides in the plate thickness direction, thereby fixing the limit switch 103 to the plug attachment plate 118. The charging plug 36 is attached to the plug attachment plate 118 using the pair of nuts 75. The limit switch 103 is disposed on the upper side of the hinge 102 so as to oppose the contactor 110. Further, the limit switch 103 includes a movable element or mover 121. The mover 121 is capable of moving in a parallel direction to the plate thickness direction of the plug attachment plate 118 (the left-right direction in FIG. 7). Furthermore, the mover 121 is biased in a single direction (the leftward direction in FIG. 7) by a return spring built into the limit switch 103. The contactor 110 contacts the mover 121. Positional adjustment between the mover 121 of the limit switch 103 and the pressing plate 101 is performed using the bolt 110a and the nut 110b of the contactor 110. More specifically, in a state (to be described in detail below) where a front surface 101a of the pressing plate 101 contacts a butting portion 124 of the limiting plate 105, the positions of the mover 121 and the pressing plate 101 are finely adjusted by tightening the bolt 110a until a desired state in which the mover 121 of the limit switch 103 is pressed in by a predetermined amount is realized, whereupon the bolt 110a is fixed to the pressing plate 101 by fastening the nut 110b. In so doing, an operation to adjust the positions of the limit switch 103 and the pressing plate 101 can be performed easily.

Figure 8:
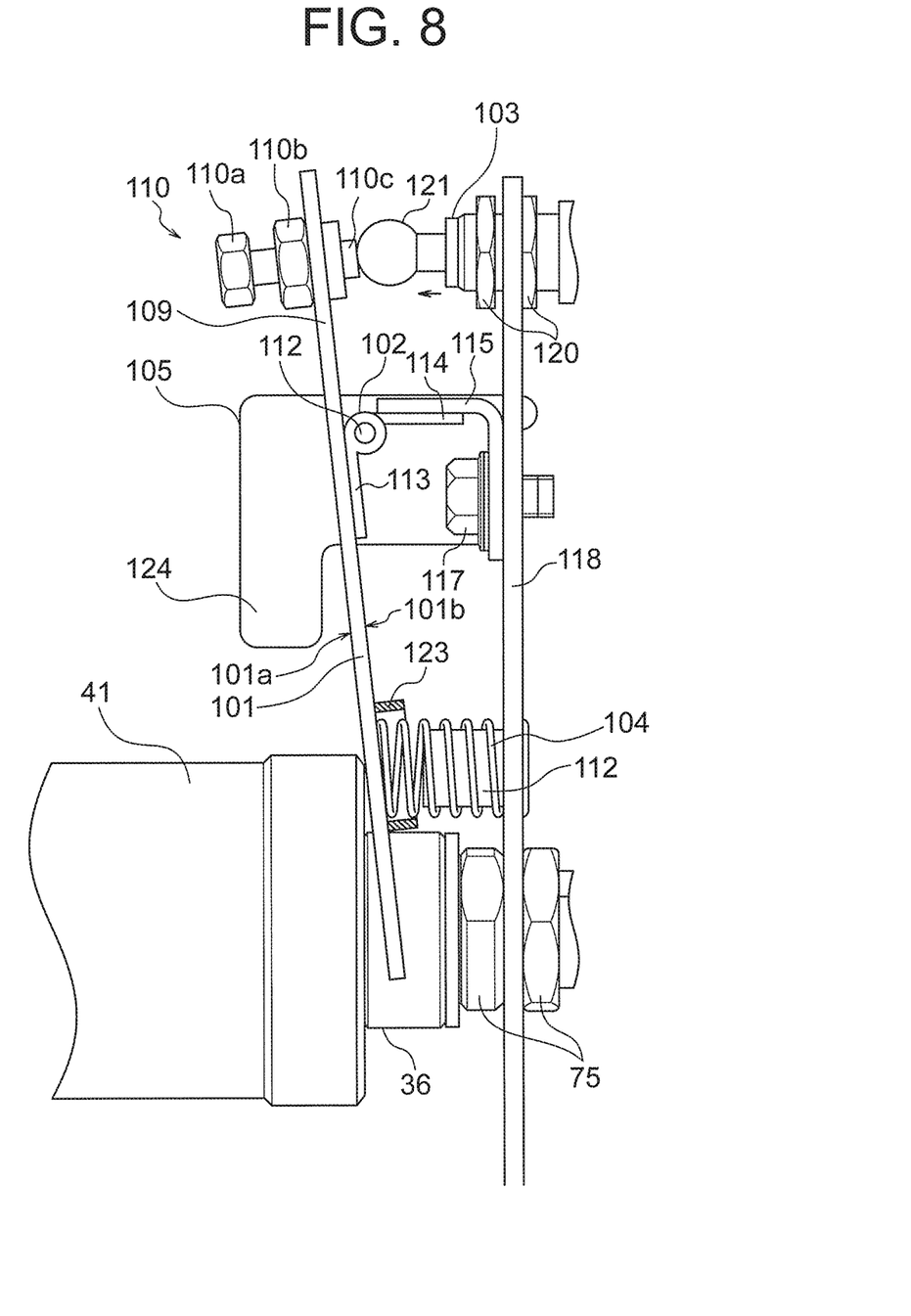
FIG. 8 is a view illustrating an operation of the detection mechanism shown in FIG. 7.

FIG. 7 shows a state in which the pressing plate 101 is disposed in the initial position. In the disposal state shown in FIG. 7, the screw portion 110c of the bolt 110a serving as one of the constituent elements of the mover 121 contacts the mover 121, and as a result, the mover 121 is pressed into the main body part of the limit switch 103 by a predetermined amount. Here, the predetermined amount is an amount required to switch the output signal of the limit switch 103 from the OFF state to the ON state when the mover 121 is pressed in against the biasing force of the return spring built into the limit switch 103. In the disposal state shown in FIG. 7, therefore, the output signal of the limit switch 103 is in the ON state. When, on the other hand, the pressing plate 101 moves in the counterclockwise direction of FIG. 7 about the shaft portion 112 of the hinge 102, as shown in FIG. 8, the contactor 110 displaces in a direction heading away from the limit switch 103 in accordance with the tilt of the pressing plate 101. At this time, the mover 121 of the limit switch 103 is made to project in the leftward direction of FIG. 8 in accordance with the displacement of the contactor 110 by the biasing force of the return spring, not shown in the figure. As a result, the output signal of the limit switch 103 shifts from the ON state to the OFF state.

Spring Member

The spring member 104 corresponds to a biasing member for biasing the pressing plate 101 in the clockwise direction of FIG. 7. The spring member 104 is disposed between the pressing plate 101 and the plug attachment plate 118 in the central axis direction of the charging plug 36. The spring member 104 is configured by a compression coil spring. When the pressing plate 101 is pushed toward the rear side by the tip end portion of the charging socket 41, the spring member 104 undergoes compressive deformation, thereby generating spring force for pushing the pressing plate 101 back toward the front side. Further, when the charging socket 41 is not connected to the charging plug 36, the spring member 104 generates spring force for holding the pressing plate 101 in the initial position.

The spring member 104 is supported by a support pin 122. The support pin 122 is fixed to the plug attachment plate 118. The support pin 122 projects in the plate thickness direction of the plug attachment plate 118, and the spring member 104 is attached to this projecting part. Further, when the surface, among two main surfaces 101a, 101b of the pressing plate 101, that faces the outer side of the casing 32 (see FIG. 2) is set as a front surface 101a and the surface that faces the inner side of the casing 32 is set as a rear surface 101b, a tubular portion 123 is provided on the rear surface 101b. The tubular portion 123 may be formed integrally with the pressing plate 101 or fixed to the pressing plate 101 by adhesion, screwing, or the like. One end portion of the spring member 104 is housed in the tubular portion 123. The tubular portion 123 is used to suppress positional deviation of the spring member 104 relative to the pressing plate 101.

Limiting Plate

The limiting plate 105 is attached to the plug attachment plate 118. The limiting plate 105 may be formed integrally with the bracket 115 or attached to the plug attachment plate 118 as a separate member to the bracket 115. The limiting plate 105 includes an integral butting portion 124. The butting portion 124 is disposed on the front surface 101a side of the pressing plate 101. Further, the butting portion 124 projects downward. The movable range of the pressing plate 101 is limited by contact between the front surface 101a of the pressing plate 101 and the butting portion 124 of the limiting plate 105. Further, the initial position of the pressing plate 101 is determined univocally when the front surface 101a of the pressing plate 101 butts the butting portion 124 of the limiting plate 105. At this time, the pressing plate 101 is held in a state of butting the butting portion 124 by the biasing force of the spring member 104. The initial position of the pressing plate 101 indicates the position of the pressing plate 101 when the charging socket 41 is not connected to the charging plug 36, or more specifically, the position of the pressing plate 101 when the front surface 101a of the pressing plate 101 is caused to butt the butting portion 124 by the biasing force of the spring member 104.

Operation of Detection Mechanism

Next, an operation of the detection mechanism 100 according to the second embodiment of the present disclosure will be described.

First, when the charging socket 41 is not connected to the charging plug 36, as shown in FIG. 7, the pressing plate 101 receives the biasing force of the spring member 104 so as to butt the butting portion 124 of the limiting plate 105, and as a result, the pressing plate 101 is held in the initial position. When the pressing plate 101 is in the initial position, the contactor 110 presses the mover 121 of the limit switch 103 in by a predetermined amount against the biasing force of the return spring (not shown) built into the limit switch 103. Accordingly, the output signal of the limit switch 103 enters the ON state. The force by which the contactor 110 presses in the mover 121 is obtained from the biasing force of the spring member 104, which is disposed on the opposite side of the shaft portion 112 of the hinge 102 to the contactor 110.

When, on the other hand, the charging socket 41 is plugged onto the charging plug 36, the tip end portion of the charging socket 41 contacts the front surface 101a of the pressing plate 101 midway through the plugging-in operation. When the charging socket 41 is further plugged in, the pressing plate 101 is pushed by the charging socket 41 so as to move in the counterclockwise direction of FIG. 8 about the shaft portion 112. At this time, the spring member 104 is pressed by the pressing plate 101 so as to undergo compressive deformation. Moreover, as described above, when the pressing plate 101 moves, the contactor 110 displaces in a direction heading away from the limit switch 103 in accordance with the tilt of the pressing plate 101. At this time, the mover 121 of the limit switch 103 is caused to project in the leftward direction of FIG. 8 in accordance with the displacement of the contactor 110 by the biasing force of the return spring, not shown in the figures. As a result, the output signal of the limit switch 103 shifts from the ON state to the OFF state.

Further, when the charging socket 41 is unplugged from the charging plug 36, the pressing plate 101 moves in the clockwise direction of FIG. 8 about the shaft portion 112 while receiving the biasing force of the spring member 104. At this time, the pressing plate 101 moves until caused to butt the butting portion 124 of the limiting plate 105 by the biasing force of the spring member 104. The spring member 104 thus functions to return the pressing plate 101 to the initial position. Meanwhile, as the pressing plate 101 moves, the upper portion 109 of the pressing plate 101 and the contactor 110 attached thereto displace in a direction approaching the limit switch 103. Accordingly, the contactor 110 presses in the mover 121 of the limit switch 103 by a predetermined amount, and as a result, the output signal of the limit switch 103 shifts from the OFF state to the ON state.

Hence, in the detection mechanism 100 according to the second embodiment, when the charging socket 41 is plugged onto the charging plug 36, the output signal of the limit switch 103 enters the OFF state, and when the charging socket 41 is unplugged from the charging plug 36, the output signal of the limit switch 103 enters the ON state. Therefore, by monitoring the output signal of the limit switch 103, it is possible to detect whether or not the charging socket 41 is connected to the charging plug 36. Moreover, in the control system of the fuel cell-type industrial vehicle according to the second embodiment, the FC controller 81 determines that the charging socket 41 is not connected to the charging plug 36 when the output signal of the limit switch 103 is in the ON state and determines that the charging socket 41 is connected to the charging plug 36 when the output signal of the limit switch 103 is in the OFF state. Having determined that the charging socket 41 is connected to the charging plug 36, the FC controller 81 blocks the permission line 87 in order to prohibit the operations (the travel operation and the load handling operation) of the vehicle main body of the forklift 10. By employing this configuration, when a fault occurs in the limit switch 103 due to being dropped or the like, for example, the output signal of the limit switch 103 is held in the same state as when the charging socket 41 is connected, i.e. the OFF state. As a result, the occurrence of an error in which operation of the vehicle main body is permitted erroneously during fuel gas charging can be avoided. It is therefore possible to provide a fuel cell-type industrial vehicle having a more robust configuration for executing control to ensure that the industrial vehicle does not move while being charged with fuel gas.

MODIFIED EXAMPLES, ETC.

The technical scope of the present disclosure is not limited to the embodiments described above and includes embodiments to which various modifications and improvements have been added within a scope from which the specific effects obtained from the constituent elements of the invention and combinations thereof can be derived.

Figure 9:
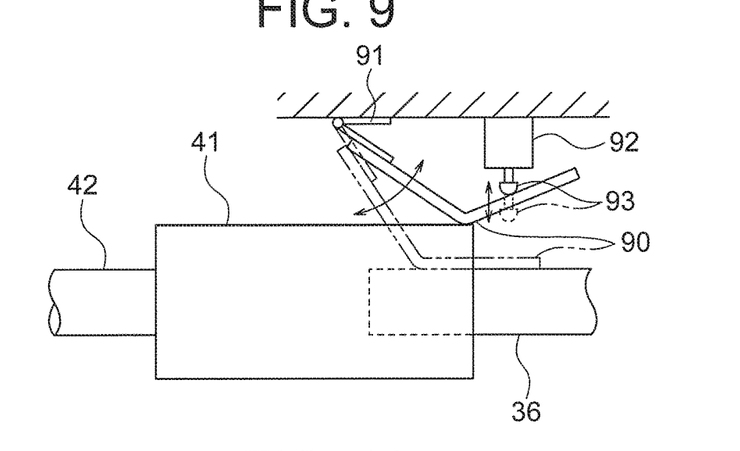
FIG. 9 is a schematic view illustrating a first modified example of the detection mechanism.

For example, in the first and second embodiments described above, a configuration in which the pressing plate 51, 101 is used as the moving member and the output signal of the limit switch 53, 103 shifts in response to the movement of the pressing plate 51, 101 was employed as the configuration of the detection mechanism 45, 100, but the present disclosure is not limited thereto. As shown in FIG. 9, for example, it is also possible to employ a configuration in which a lever 90 is supported by a hinge 91 to be free to perform a rotary motion, and when the lever 90 is pushed by the charging socket 41 plugged onto the charging plug 36 so as to move in the counterclockwise direction of the figure, a mover 93 of a limit switch 92 is pressed in. Further, although not shown in the figures, a configuration in which the mover of the limit switch is pressed in using a cam mechanism or a link mechanism or a configuration in which the charging socket 41 plugged onto the charging plug 36 presses in the mover of the limit switch directly may also be employed.

Furthermore, in the first and second embodiments described above, as regards the pair of nuts 70, 120 for supporting the limit switch 53, 103, there are no limitations on the method for fixing the limit switch 53, 103, and the limit switch 53, 103 may be fixed to the plug attachment plate 68, 118 using a single nut, the limit switch 53, 103 may be fixed to the plug attachment plate 68, 118 directly by being welded thereto directly, i.e. without using nuts, and so on.

Moreover, the sensor provided in the detection mechanism 45 or the detection mechanism 100 is not limited to a contact sensor such as a limit switch, and a non-contact sensor may be used instead. A distance sensor 94 shown in FIG. 10 or an optical sensor 95 shown in FIG. 11, for example, may be used as the non-contact sensor.

Figure 10:
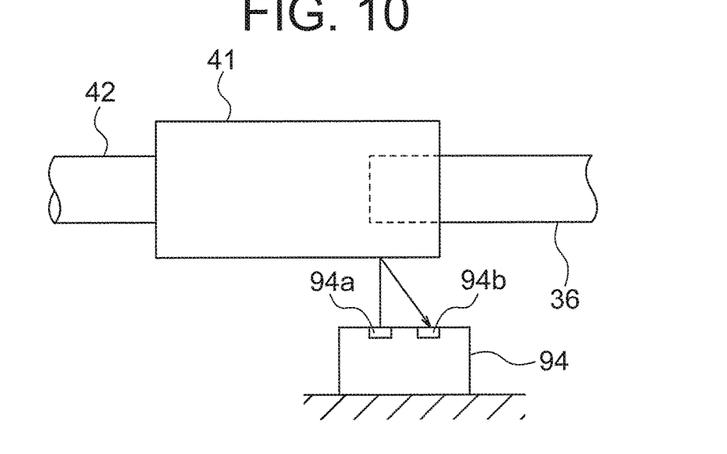
FIG. 10 is a schematic view illustrating a second modified example of the detection mechanism.

In FIG. 10, the distance sensor 94 is provided near the charging plug 36. The distance sensor 94 includes a light-emitting portion 94a and a light-receiving portion 94b. The distance sensor 94 outputs a sensor signal corresponding to a time difference between a point at which light is emitted from the light-emitting portion 94a toward a measurement subject to a point at which the light-receiving portion 94b receives light reflected by the measurement subject. Hence, the output signal of the distance sensor 94 shifts in accordance with the distance from the light-emitting portion 94a to the measurement subject. Meanwhile, the measurement subject changes according to whether or not the charging socket 41 is connected to the charging plug 36. More specifically, when the charging socket 41 is not connected to the charging plug 36, the charging plug 36 serves as the measurement subject, and when the charging socket 41 is connected to the charging plug 36, the charging socket 41 serves as the measurement subject. Therefore, the output signal of the distance sensor 94 shifts in accordance with the connection state of the charging socket 41 relative to the charging plug 36. As a result, it is possible to detect whether or not the charging socket 41 is connected to the charging plug 36 on the basis of the output signal of the distance sensor 94.

Figure 11:
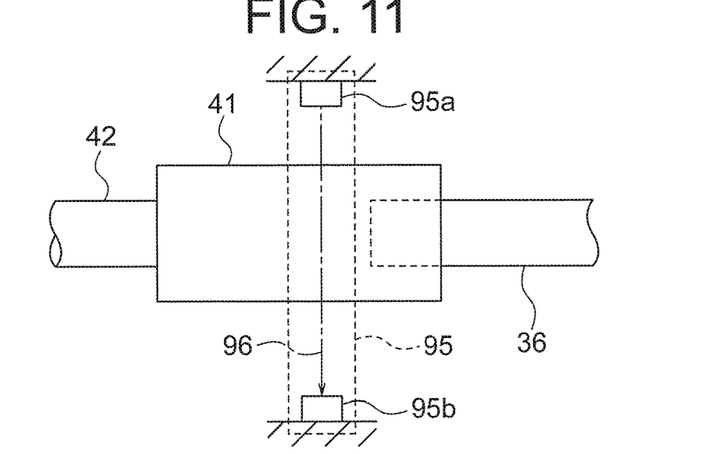
FIG. 11 is a schematic view illustrating a third modified example of the detection mechanism.

In FIG. 11, meanwhile, the optical sensor 95 is provided near the charging plug 36 in alignment with the position in which the charging socket 41 is plugged onto the charging plug 36. The optical sensor 95 is a transmissive optical sensor having a light-emitting portion 95a and a light-receiving portion 95b. A sensor optical axis 96 exists between the light-emitting portion 95a and the light-receiving portion 95b, and the light-emitting portion 95a and light-receiving portion 95b oppose each other along the sensor optical axis 96. An output signal from the optical sensor 95 enters an ON state when light emitted from the light-emitting portion 95a is received by the light-receiving portion 95b and enters an OFF state when light is not received by the light-receiving portion 95b. The sensor optical axis 96 is set in a position that is blocked by the charging socket 41 when plugged onto the charging plug 36. Therefore, when the charging socket 41 is connected to the charging plug 36, a sensor beam emitted from the light-emitting portion 95a is blocked by the charging socket 41, and as a result, the output signal of the optical sensor 95 enters the OFF state. Further, when the charging socket 41 is not connected to the charging plug 36, the sensor beam emitted from the light-emitting portion 95a is received by the light-receiving portion 95b, and as a result, the output signal of the optical sensor 95 enters the ON state. Hence, the output signal of the optical sensor 95 shifts in accordance with the connection state of the charging socket 41 relative to the charging plug 36. It is therefore possible to detect whether or not the charging socket 41 is connected to the charging plug 36 on the basis of the output signal of the optical sensor 95. Note that here, a transmissive optical sensor is shown as an example, but a reflective optical sensor may also be used.

Furthermore, in the first embodiment, the spring member 54 serving as the biasing member is disposed between the pressing plate 51 and the plug attachment plate 68, but the present disclosure is not limited thereto, and although not shown in the figures, a configuration in which a helical torsion spring serving as the biasing member is attached to a part of the hinge 52 (see FIG. 4), for example, may also be employed. Moreover, the biasing member is not limited to a spring member and may be formed from highly stretchable rubber or the like, for example. This point applies similarly to the second embodiment.

Furthermore, in the first embodiment, when the output signal of the limit switch 53 is in the ON state in a state where the vehicle key switch 83 has detected the key ON state, the FC controller 81 prohibits the operations of the vehicle main body of the forklift 10 by blocking the permission line 87. The present disclosure is not limited thereto, however, and the operations of the vehicle main body of the forklift 10 may be prohibited by blocking the power supply line 86 instead of the permission line 87, for example. Blocking the power supply line 86 instead of the permission line 87 may also be applied to the second embodiment.

Further, in the first and second embodiments, the travel operation and the load handling operation were both cited as the operations of the vehicle main body of the forklift 10 that are prohibited by the vehicle controller 82 when the FC controller 81 blocks the permission line 87, but the present disclosure is not limited thereto, and the travel operation may be prohibited alone.

Moreover, in the first embodiment, the FC controller 81 and the vehicle controller 82 are provided separately, but control may be executed by a single controller. This point applies similarly to the second embodiment.

Furthermore, in the first embodiment, a configuration in which a charging lid is not provided on the fuel cell unit 26 was employed, but the present disclosure is not limited thereto, and control may be executed to ensure that the industrial vehicle does not travel while being charged with fuel gas even when a charging lid is provided on the fuel cell unit 26. This point applies similarly to the second embodiment. Note, however, that in order to simplify the charging operation performed by the operator, it is preferable to employ a configuration in which a charging lid is not provided.

Further, in the first embodiment, a configuration in which the cover 29 is attached to the vehicle body portion 11 was employed, but the present disclosure is not limited thereto, and a configuration in which the cover 29 is not attached may be employed. This point applies similarly to the second embodiment. Note, however, that in order to improve the design of the forklift 10, it is preferable to employ a configuration in which the cover 29 is attached.

Furthermore, in the first embodiment, a fuel cell type forklift was cited as an example of a fuel cell-type industrial vehicle, but the present disclosure is not limited thereto and may be applied to another fuel cell-type industrial vehicle, such as a fuel cell type tow truck, for example. This point applies similarly to the second embodiment.

What is claimed is:

1. A fuel cell-type industrial vehicle, comprising:
a fuel cell unit including a fuel cell;
a fuel tank provided in the fuel cell unit and configured to store fuel gas that is supplied to the fuel cell;
a vehicle main body in which the fuel cell unit is installed; and
a controller configured to control operations of the vehicle main body,
the fuel cell unit comprising:
   a charging plug configured to charge the fuel tank with the fuel gas, the charging plug being connectable to a charging socket for supplying the fuel gas; and
   a detection mechanism configured to detect a connection state between the charging plug and the charging socket,
wherein the detection mechanism includes
   a pressing plate disposed near the charging plug and having a surface configured to be contacted by a tip end portion of the charging socket, wherein the pressing plate has a recess portion disposed around the charging plug,
   a sensor having an output signal that shifts in accordance with the connection state of the charging socket relative to the charging plug, and
wherein the controller executes control to prohibit the operations of the vehicle main body after determining, on the basis of the output signal of the sensor, that the charging socket is connected to the charging plug.

2. The fuel cell-type industrial vehicle according to claim 1, wherein the detection mechanism includes a hinge that freely movably supports the pressing plate, and a limit switch,
wherein the output signal shifts when the limit switch is pressed by the pressing plate.

3. The fuel cell-type industrial vehicle according to claim 1, wherein the charging plug is configured so that the charging socket is capable of being plugged thereon and unplugged therefrom,
the detection mechanism includes a moving member that is pushed by the charging socket so as to move in a predetermined direction when the charging socket is plugged onto the charging plug, and
the sensor includes a mover that is pressed in by the movement of the moving member so that when the mover is pressed in, the output signal shifts.

4. The fuel cell-type industrial vehicle according to claim 3, further comprising a biasing member configured to bias the moving member in a direction opposite to the predetermined direction.

5. The fuel cell-type industrial vehicle according to claim 4, wherein the moving member is provided with a tubular portion, and
one end portion of the biasing member is housed in the tubular portion.

6. The fuel cell-type industrial vehicle according to claim 1, wherein the charging plug is configured so that the charging socket is capable of being plugged thereon and unplugged therefrom,
that the pressing plate is pushed by the charging socket so as to move in a predetermined direction when the charging socket is plugged onto the charging plug, and
the sensor includes a mover that is released from a pressed-in state by the movement of the moving member so that when the mover is released from the pressed-in state, the output signal shifts.

7. The fuel cell-type industrial vehicle according to claim 1, further comprising a vehicle key switch configured to detect a key ON state,
wherein the controller executes control to prohibit the operations of the vehicle main body when the vehicle key switch detects the key ON state and the controller determines, on the basis of the output signal of the sensor, that the charging socket is connected to the charging plug.

8. The fuel cell-type industrial vehicle according to claim 1, wherein the recess portion is a semicircular recess portion.

* * * * *